United States Patent Office 3,489,906
Patented Jan. 13, 1970

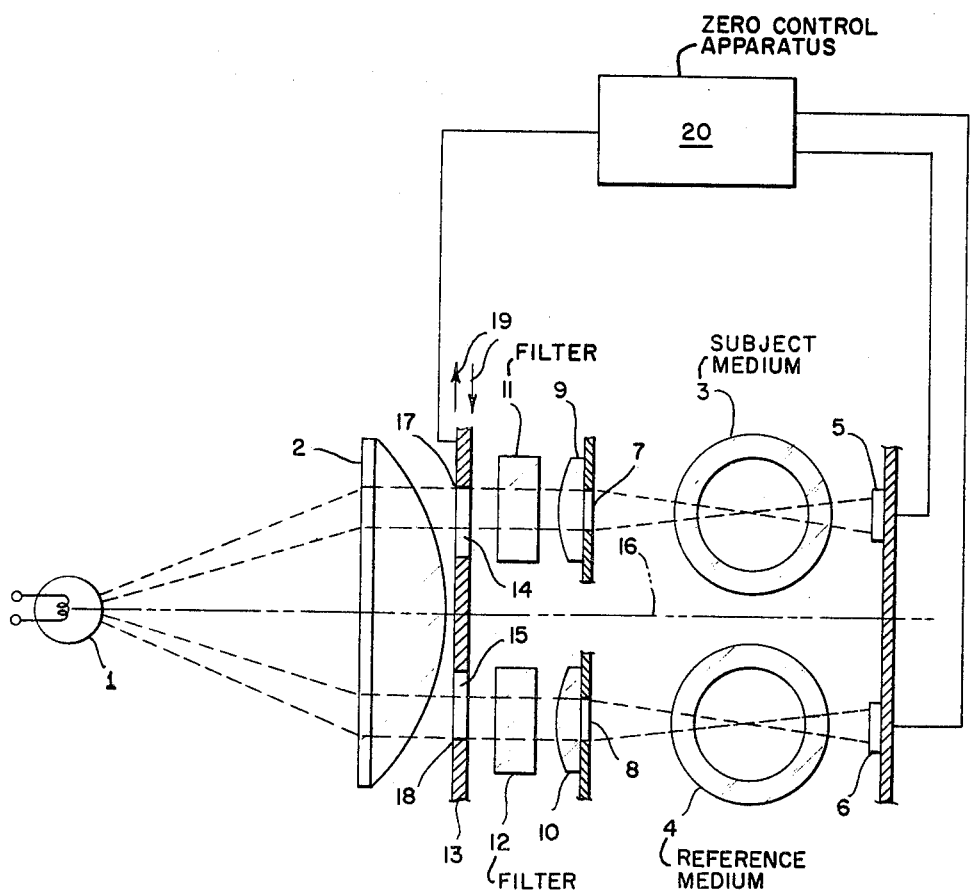

3,489,906
OPTICAL SYSTEM FOR MEASURING
ABSORPTION OF LIGHT
Palle-Finn Beer, Lidingo, Sweden, assignor to AB Autokemi, Stockholm, Sweden, a corporation of Sweden
Filed Apr. 22, 1966, Ser. No. 544,540
Claims priority, application Sweden, Apr. 26, 1965,
5,427/65
Int. Cl. G01n 21/26; G01d 5/34
U.S. Cl. 250—218
8 Claims

ABSTRACT OF THE DISCLOSURE

An optical system for measuring light absorbed by a subject medium relative to a reference medium. Light rays are directed from a source into two parallel beams of light, one to the reference medium and the other to the subject medium. A light sensor determines the amount of light of each beam passing through each of said mediums. A movable light mounted between the light source and the mediums is capable of either varying the reference beam while leaving the subject beam unaffected, or varying the subject beam while leaving the reference beam unaffected.

---

This invention relates to an optical system for measuring absorption of light in a medium such as a fluid. More particularly, it relates to an optical system of the type referred to wherein the light absorption of a subject medium is measured by comparing it to the light absorption in a reference medium.

It is often desirable to determine certain characteristics of a medium by measuring the amount of light absorbed by the medium. Procedures and apparatus for measuring light absorption of a medium are, of course, well known. However, the previously known devices have several disadvantages. Some previous devices have employed a single light source to develop the two beams of light, one to the subject medium and one to the reference medium, by employing light rays generated from opposite sides of the light source. This arrangement requires a multitude of reflectors making it bulky and expensive.

The previous devices have also had the disadvantage of being quite inflexible. To measure the light absorption at least one of the light beams are generally modified in some way to establish some type of balance between the beams, the amount of energy or movement necessary to establish the balance being a measure of the amount of light absorbed by the medium. For example, in a given apparatus it has been possible to adjust either the light beam to the subject medium or the light beam to the reference medium, but not both. No apparatus has been known in which either of the two light beams may be adjusted to obtain the balance therebetween. In still other devices no provision is made for a reference "medium." Instead, an element such as a movable prism is built into the apparatus to vary the intensity of the reference beam directly. In this arrangement, since no reference "medium" is provided it would not be possible to obtain a direct comparison between two subject mediums when it is desired merely to determine if the two mediums are alike without the necessity for determining absolute values.

Thus it is a purpose of the present invention to provide an optical apparatus which is compact, simple, flexible and yet provides an extremely reliable balancing between the two light beams.

According to the present invention there is provided an optical apparatus in which both the subject medium and the reference medium are arranged on the same side of the illuminating lamp. This provides a compact arrangement eliminating the reflectors that have been employed when the reference and subject mediums have been placed on opposite sides of the lamp. The light from the illuminating lamp is transmitted through a collimating lens thereby generating a beam of light having parallel light rays. One part of the beam passing through the collimating lens hereinafter referred to as the subject beam, passes throught the subject medium to a first photocell while another part of the said beam hereinafter referred to as the reference beam, passes through the reference medium to a second photocell.

The means for varying the quantity of the light of each beam which will reach the mediums is mounted between the collimating lens and the two mediums. In this way the means for varying the light quantity is separated from the reference or subject mediums themselves so that different reference mediums as well as different subject mediums may be employed. The flexibility of the apparatus is further provided by the fact that the varying means allows either the reference beam or the subject beam to be modified.

The varying means comprises fixed diaphragms having fixed sized holes allowing a certain amount of the light in each beam to pass through to the corresponding medium. A movable diaphragm is provided between the fixed diaphragms and the collimating lens. This movable diaphragm is so arranged that movement in one direction will reduce the amount of light in one of the beams while leaving the second unchanged and movement in the opposite direction will reduce the amount of light in the second beam while leaving the first unchanged. In a preferred embodiment of the invention a convex lens such as a cylindrical lens may be employed in each beam to direct the rays of light in that beam to the center of the corresponding medium. Additionally, filter means may be provided in the beams to restrict the type of light which passes through to the two mediums.

Thus, it is an object of this invention to provide an optical apparatus for measuring the light absorption in a subject medium which apparatus overcomes the disadvantages present in the previously known apparatus.

It is another object of this invention to provide an optical apparatus of the type referred to which is simple, compact, flexible and reliable.

It is still another object of this invention to provide an optical apparatus of the type referred to in which either the reference beam or the subject beam may be varied to establish a balance between the quantity of light in the light beams after they have passed through the mediums.

Other objects and the attendant advantages of this invention will become apparent in the detailed description to follow together with the accompanying drawings in which:

The single figure of this application is a schematic view of an optical system according to the present invention.

Referring to the drawing, light is emitted from the illuminating lamp 1 and is transmitted through a collimating lens 2 to form a beam of parallel light rays. One part of the light beam from the collimating lens passes through the subject medium, that is, the medium being investigated. By way of illustration, the subject medium may be enclosed in a cylindrical tube 3, preferably made of glass or plastic. Another part of the light is made to pass through a reference medium which may also be enclosed in a similar cylindrical tube 4. The light which passes through the subject medium impinges upon a photocell 5 while the light passing thhrough the reference medium impinges upon a second photocell 6. The size of the light beam which reaches the subject medium in the tube 3 is determined by the size of a hole in a fixed diaphragm 7. In the same way the size of the light beam which reaches the reference medium in the tube 4 is determined by the size of a hole in another diaphragm 8. Cylindrical lenses 9 and 10 are provided to direct the light rays through the holes in diaphragms 7 and 8 to the center of the tubes 3 and 4, respectively, so that the light will pass through the mediums in a radial direction. The cylindrical lenses 9 and 10 are preferably constructed with one plane surface which is placed onto the diaphragms 7 and 8 respectively. Filters 11 and 12 may be provided in the beams of light before the cylindrical lenses so that only selected light, such as monochromatic light, can be made to pass to the mediums.

Between the collimating lens and the cylindrical lenses 9 and 10 there is provided a movable diaphragm plate 13 having holes 14 and 15 associated with the holes in diaphragms 7 and 8 respectively. When the movable plate 13 is positioned symmetrically about the optical axis 16 of the system the outer edges 17 and 18 of the holes 14 and 15 coincide with the outer boundaries of the beams of light allowed through the holes in diaphragms 7 and 8 respectively. However, while the movable plate 13 is in this position the inner edges of the holes 14 and 15 are spaced inwardly towards the optical axis 16 from the inner boundary of the beams provided by the holes in diaphragms 7 and 8 respectively. The movable plate 13 may be moved in either direction, as indicated by arrows 19, in a plane perpendicular to the optical axis 16. From this arrangement it follows that upon a displacement of the plate 13 toward the subject beam, this beam will not be interrupted but the outer edge 18 of the hole 15 will cut off a portion of the reference beam. Conversely, by moving the plate 13 in the opposite direction the edge 17 of hole 14 will cut off a portion of the subject beam while the reference beam remains unchanged.

With this arrangement, when the quantity of the light beams impinging upon the two photocells 5 and 6 are unequal, due to a difference in the light absorbed by each of the two mediums, they can be balanced by reducing the quantity of light in the higher beam to the level of the lower regardless of which of the beams happens to be the higher. Two modes of operation are suggested. First a known reference medium may be used in which case the difference in the intensities of the two light beams impinging upon the photocells will represent the value of the characteristic being studied. This difference can be ascertained conveniently by noting the distance and direction which the plate 13 must move to establish a balance in the two beams at the photocells. Secondly, two unknown mediums could be rapidly and reliably compared to ascertain whether they are identical in any respect. For example, it may be necessary to determine whether two unknown blood samples are similar in certain respects.

The movement of the plate 13 can, of course, be made directly responsive to the difference between the electrical current generated in the photocells 5 and 6. In the drawing the current from the photocells to the plate is shown as passing through a block 20. This could be a well known zero type apparatus including for example, amplifiers, a potentiometer responsive to the current generated by photocells 5 and 6 after amplification thereof, and a reversible motor which mechanically operates the movable plate 13.

Although the invention has been described above in considerable detail with respect to a specific embodiment thereof, it should be apparent that variations and modifications may be made without departing from the spirit and scope of the invention except as limited by the appended claims wherein:

I claim:

1. An optical system for measuring light absorbed by a subject medium by comparison to the light absorbed by a reference medium comprising: a light source, a means for directing the light rays from said source into two parallel beams of light, one being a reference beam and the other being a subject beam, a reference medium being mounted in the reference beam and the subject medium being mounted in the subject beam, a light sensitive means for determining the amount of light of each beam passing through each of said mediums, and a balancing means mounted between the light source and the said mediums for either varying the reference beam while leaving the subject beam unaffected, or varying the subject beam while leaving the reference beam unaffected, said balancing means including a movable plate having a reference hole through which the reference beam passes and a subject hole through which the subject beam passes, said holes being arranged on the plate so that movement of the plate in one direction will cause the reference beam to be altered while the subject beam remains unchanged, and movement of the plate in a second direction causes the subject beam to be altered while the reference beam remains unchanged.

2. An optical system as claimed in claim 1 wherein said photosensitive means includes a separate photocell associated with each medium.

3. An optical system as claimed in claim 2 including a means responsive to the current generated by the said photocells for operating the said balancing means.

4. An optical system as claimed in claim 1 wherein both of said beams are derived from light emanating from the same side of the said light source, and wherein the said means for directing the light into parallel beams of light includes a collimating lens mounted between the light source and the said balancing means.

5. An optical system as claimed in claim 1 wherein the said mediums are mounted in cylindrical tubes the axes of which are perpendicular to the axis of the respective beams, and including a convex lens mounted in each beam between the balancing means and the tube for directing the light of each beam to the center of the tube associated with that beam of light so that the light passes through the medium in a radial direction with respect to said cylindrical tubes.

6. An optical system as claimed in claim 5 wherein the size of each beam when unaffected by the balancing means is determined by a hole in a fixed plate, and said plate is mounted adjacent the said convex lens associated with the respective beam.

7. An optical system for measuring light absorbed by a subject medium by comparison to the light absorbed by a reference medium, comprising: a light source, a collimating means for directing the light rays from said source into two parallel beams of light, one being a reference beam and the other being a subject beam, a reference medium being mounted in the reference beam, a cylindrical tube having the subject medium therein and being mounted in the subject beam, a means between said collimating means and said cylindrical tube for converging the parallel rays into rays passing through the center of the said tube, radially with respect to the tube, a light sensitive means for determining the amount of light of each beam passing through each of said mediums, and a balancing means mounted between the light source and the said mediums for either varying the reference beam while leaving the subject beam unaffected, or varying the subject beam while leaving the reference beam unaffected.

8. An optical system according to claim 7 wherein the last said means is a convex lens.

References Cited

UNITED STATES PATENTS

| | | | |
|---|---|---|---|
| 2,286,820 | 6/1942 | Lenehan | 250—229 X |
| 2,718,597 | 9/1955 | Heigl et al. | 250—218 X |
| 2,641,956 | 6/1953 | Morrison et al. | 250—204 X |
| 3,060,360 | 10/1962 | Tomek | 250—204 X |
| 3,279,305 | 10/1966 | Muta et al. | 250—218 X |
| 2,896,502 | 7/1959 | Nordin | 356—208 |

WALTER STOLWEIN, Primary Examiner

U.S. Cl. X.R.

250—229